United States Patent [19]

Gerkema et al.

[11] 4,085,430
[45] Apr. 18, 1978

[54] THIN FILM MAGNETIC HEAD WITH A GAP FORMED BETWEEN A LOOP SHAPED CORE PART AND A BRIDGING CORE PART

[75] Inventors: Jan T. Gerkema; Frederik Willem Gorter, both of Eindhoven, Netherlands

[73] Assignee: U.S. Philips Corporation, New York, N.Y.

[21] Appl. No.: 648,408

[22] Filed: Jan. 12, 1976

Related U.S. Application Data

[63] Continuation of Ser. No. 530,277, Dec. 6, 1974, abandoned.

[30] Foreign Application Priority Data

Jan. 24, 1974 Netherlands ............................ 7400955

[51] Int. Cl.² ............................ G11B 5/25; G11B 5/27
[52] U.S. Cl. ...................................... 360/119; 360/121
[58] Field of Search ................................ 360/119–121, 360/123, 127

[56] References Cited

U.S. PATENT DOCUMENTS

| | | | |
|---|---|---|---|
| 3,013,123 | 12/1961 | Camras | 360/121 |
| 3,889,295 | 6/1975 | Billawala | 360/123 |

*Primary Examiner*—Robert S. Tupper
*Attorney, Agent, or Firm*—Frank R. Trifari; Simon L. Cohen

[57] ABSTRACT

A thin-film magnetic head having improved playback properties in which the gap-bounding core parts overlap each other laterally while enclosing a layer having a gap and in which a first core part has the shape of a closed loop and is bridged in the center by a second core part. The parts of the first core part on either side of the bridge are provided with identical coils, while the first core part at the area of the overlap is divided centrally by an extra gap. Upon playing back, the difference signals of the coils then provides an indication as regards the position relative to the track.

9 Claims, 4 Drawing Figures

U.S. Patent
April 18, 1978
4,085,430
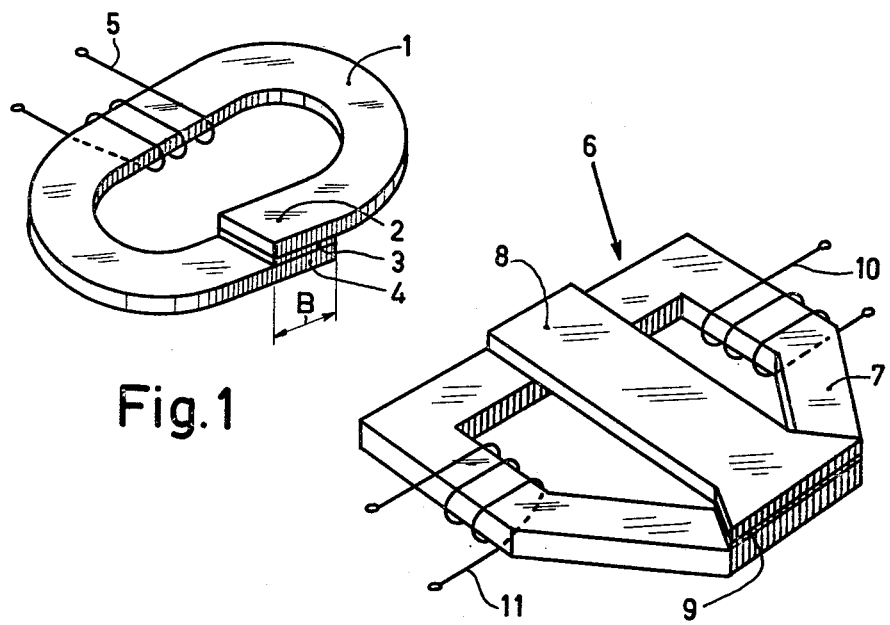
Fig. 1
Fig. 2
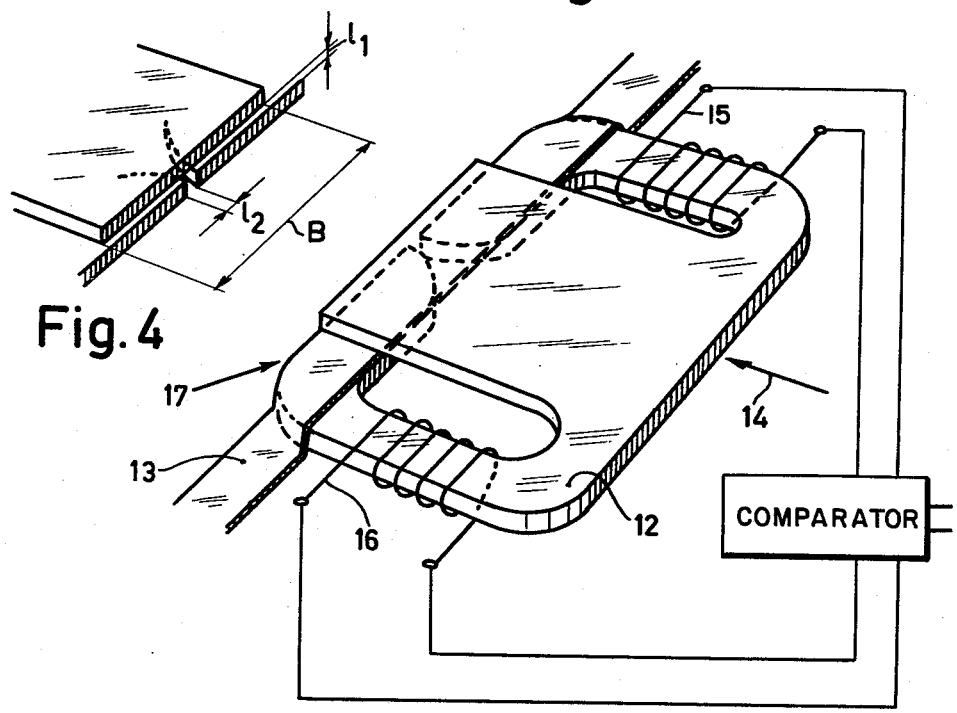
Fig. 4
Fig. 3

THIN FILM MAGNETIC HEAD WITH A GAP FORMED BETWEEN A LOOP SHAPED CORE PART AND A BRIDGING CORE PART

This is a continuation, of application Ser. No. 530,277, filed Dec. 6, 1974, now abandoned.

The invention relates to a thin-film magnetic head which has an electric winding and comprises a number of core parts of a magnetizable material of which at least the gap-bounding core parts are thin layers and overlap each other laterally while enclosing a gap-defining layer of a non-magnetizable material.

Such a magnetic head which is used for example in storing information in magnetic disc memories, is known from the published German patent application No. 2,104,445.

Presently there exists in the industry a need of an increase of memory storage capacity and hence of magnetic heads for very narrow tracks. The present track width lies in the range of 150 to 200 microns. In connection with the above, however, there exists a need of track widths of a few tens of microns. Since, however, magnetic heads suitable for such narrow tracks can no longer be realized in the conventional manner, in which two core parts are placed in line with the interposition of a non-magnetizable spacing member and in which the thickness of the core parts determines the track width, the thin-film magnetic head described in the above-mentioned German patent application has been proposed. In this magnetic head, two core parts overlap each other laterally at the area of the gap as a result of which the gap width is not determined by the thickness of the core parts but by the extent to which the core parts overlap each other. Such a construction enables the manufacture by means of thin-film methods and photolithographic methods of heads which are suitable for track widths of a few tens of microns. A drawback is, however, that the area over which the core parts overlap each other at the site of the gap, which area is large as compared with the thickness of the core parts, adversely influences the playback properties of the head: the larger the extent of overlap, the smaller the playback efficiency.

It is the object of the invention to provide a head of the above-mentioned kind in which the playback properties are less dependent on the extent of overlap of the core parts than in the known head and which moreover has a number of extra advantages.

For that purpose, the magnetic head according to the invention is characterized in that a first gap-bounding core part is present having one end which at the area of the gap has a width which corresponds to the desired track width and that a second gap-bounding core part extends at an angle with respect to the first core part on either side thereof and that the two ends of the second core part and the end of the first core part present opposite to the gap-bounding end are magnetically coupled together.

With the same overlap area of the gap-bounding parts, the magnetic head according to the invention has considerably better playback properties than the known head.

If desired, restriction of the overlap is possible by reducing the width of the second core part at the area of and on either side of the first core part.

The width of the second core part, at least at the area of the first core part, preferably is at most half of the width of the first core part.

Although the magnetic coupling of the above-mentioned ends of the core parts may be carried out, for example, by means of a closing yoke on which also an electric winding may be provided, a preferred embodiment of the magnetic head according to the invention is characterized in that the second core part is in the form of a closed loop and that the first core part bridges the loop at least substantially in the center. Such a construction can be realized very suitably and in few steps by means of thin-film methods.

The symmetric structure of the magnetic head according to the invention may advantageously be used to operate a number of said magnetic heads in an x-y array.

A further preferred embodiment of the magnetic head according to the invention is for that purpose characterized in that the parts of the loop on either side of the bridging part are each provided with one or more electric windings.

A further preferred embodiment of the magnetic head according to the invention is characterized in that in a symmetrically wound head as described above, an auxiliary gap is provided in the loop-shaped second core part exactly at the area of the center of the gap, which auxiliary gap intersects the core part entirely and extends at right angles to the gap.

The above-described construction of the head may advantageously be used to position the head correctly with respect to an information track to be followed. By providing the auxiliary gap, the actual gap is as it where divided into two parts each covering one half of a track to be followed. When the head is not positioned correctly with respect to the track, the two windings provided on the outside of the loop will provide signals which differ in amplitude during a playback operation. The difference signal may then be used to adjust the head in the correct place above the track via a servo mechanism. Once the head has been adjusted above the track, the difference signal is equal to zero and the situation is maintained. The sum signal then represents the complete playback signal.

Still a further preferred embodiment of the device according to the invention is characterized in that at least one recording winding is arranged in the overlapping region of the gap. Herewith optimum recording properties can be realized.

The invention will be described in greater detail, by way of example, with reference to the drawing.

FIG. 1 shows a thin-film magnetic head of a known type.

FIG. 2 shows a thin-film magnetic head according to the invention.

FIG. 3 shows a special construction of the thin-film magnetic head according to the invention.

FIG. 4 shows a part of the magnetic head shown in FIG. 3 on an enlarged scale.

FIG. 1 shows a known construction of a thin-film magnetic head 1 having gap-bounding parts 2 and 3 (made for example, of a nickel-iron alloy) which overlap each other laterally and which are separated at the area of the gap by a thin layer of a non-magnetic material 4, (for example glass). The track width B is determined by the extent to which the parts 2 and 3 overlap each other. The head 1 furthermore comprises electric windings 5.

FIG. 2 shows a thin-film magnetic head 6 according to the invention. It consists of a loop-like magnetic layer 7 which is bridged in the center by a magnetic layer 8. In the region of overlap of the gap, the parts 7 and 8 are separated by a strip of non-magnetic material 9. The track width B is determined by the width of the part 8.

The provision of identical electric windings 10 and 11 makes it possible to operate a plurality of these heads on the same substrate in an x-y array. The overlap of the layers 7 and 8 has been chosen to be so that an optimum recording field can be realized. For that purpose, the layer 8 ends in the form of a trumpet and the two ends 12 and 13 of the layer 7 extend at an angle of approximately 45° with respect to the layer 8.

Such a construction of a head in itself is very suitable for the magnetic recording on comparatively narrow tracks. With the positioning in the usual manner by means of a separate serve track, however, there is a lower limit imposed upon the track width which can be used. When the track becomes narrower than 100 μm it is necessary to derive a servo signal from the signal-carrying track itself, since otherwise difficulties occur upon playing back. A particular aspect of the invention resides in the fact that a solution is given to adjust magnetic heads of the type shown above a track recorded in a magnetic medium if the tracks become very narrow.

Identical recording windings 15 and 16 are provided around the two outer limbs of the magnetic circuit of a thin-film magnetic head 14 of the three-limb type (FIG. 3). As shown on an enlarged scale in FIG. 4, the front circuit 17 has two gaps. The recording-playback gap $l_1$ having a length equal to the track width B and a small auxiliary gap $l_2$, at right angles to $l_1$, in the center of the magnetic layer 12. The small auxiliary gap having a width equal to the thickness of the magnetic layer thus separates the two outer limbs of the magnetic circuit from each other in the region of overlap. This has for its result that as it where two gaps are formed in line with each other with a length equal to half the track width. When the head is positioned roughly above the track, the difference in the signals of the windings 15 and 16 may be used to adjust the head above the track, while their sum constitutes the play-back signal. When the head deviates from the track, there arises a difference in signal amplitude of the windings 15 and 16. One half of the gap $l_1$ then sees more of the recorded track than the other. The difference signal can readjust the headposition via a servomechanism. The sign of the difference signal is associated with a particular direction of the deviation.

The magnetic resistance between the two outer limbs in the front circuit 17 must be as large as possible, because when there is a deviation of the head, a maximum difference signal is necessary in view of the comparatively low flux level during playback. As a recording winding is used a strip 13 of a non-magnetizable electrically conductive material present in the region of overlap. The gap $l_2$ must be small so as to minimize during recording the disturbance in the center of the recording field of the gap $l_1$. Said gap $l_2$ otherwise requires no extra step in the manufacturing process of the head.

As already noted above, the integration of heads on batches creates the possibility of operating the heads in the form of an array. One head of said array may ensure the adjustment. Due to this adjustment, the mechanical positioning becomes simpler also in the case of very small tracks, tracks of 5 to 10 μm becoming realizable. In case the head which ensures the adjustment is the FIG. 3 head it may also fulfil its recording and playback function normally.

From a recording technical point of view the inventive head is further attractive due to the possibility which exists to provide a comparatively large number of windings and due to the favorable location of the recording-playback gap.

What is claimed is:

1. A thin-film magnetic head comprising a first loop shaped core part of magnetizable material having an upper surface with an outer edge, a second core part of magnetizable material having a lower surface and an outer edge and extending from one side of the upper surfaces of the first core part across the upper surface of the first core part to an opposite side of the first core part and overlapping an area of the upper surface of said opposite side of said first core part with a lower surface of said second core part, said second core part being magnetically coupled to said first core part at said one side of said first core part and providing an elongated surface parallel with the upper surface of the first core part and having an elongated outer edge on said elongated surface parallel to said outer edge of said first core part, and a layer of non-magnetizable material between the first and second core parts in the overlapping area thereof, the outer edges of said first and said second core parts forming therebetween a gap elongated in a direction perpendicular to the direction in which the second core part extends across the first core part.

2. A magnetic head as claimed in claim 1, wherein the first core part is in the form of a closed loop and that the second core part bridges the loop in the center.

3. A magnetic head as claimed in claim 2, wherein the portions of the first loop shaped core part on either side of the bridging second core part each have one or more electric windings.

4. A magnetic head as claimed in claim 2, wherein the width of the first core part at least at the overlapping area of the second core part is at most half the width of the second core part.

5. A magnetic head as claimed in claim 2, wherein at least one recording winding is provided in the region of overlap of the gap.

6. A magnetic head as claimed in claim 1, wherein the width of the first core part at least at the overlapping area of the second core part is at most half of the width of the second core part.

7. A magnetic head as claimed in claim 1, wherein an auxiliary gap is provided in the loop-shaped first core part exactly at the area of the center of the gap, which auxiliary gap extends at right angles to the gap and intersects the first core part entirely.

8. A thin film magnetic record/reproduce head comprising a core having a first and a second core part both in the form of a thin film layer of magnetizable material, said thin film comprising major surfaces connected by edges, said core parts having overlapping major surfaces which form opposed pole pieces adjacent the edges abutting the overlapping major surfaces, a layer on non-magnetizable material being provided between the overlapping major surfaces of said pole pieces so as to define a record/reproduce gap, in which the first core part is I-shaped and in which the second core part is in the form of a continuous single loop, the first core part laterally bridging said loop thereby forming two openings, said record/reproduce gap being defined at one end of the I-shaped first core part, the first and the second core part being magnetically coupled at the other end of the I-shaped core part in addition to the coupling at said recore/reproduce gap, and electric record/reproduce windings being wrapped around the portions of the second core part on either side of the first core part and through each of said openings.

9. An automatic track sensing head comprising a magnetic core having a first and a second core part both in the form of a thin film layer of magnetizable material, said thin film comprising major surfaces connected by edges, said core parts having overlapping major surfaces which form opposed pole pieces adjacent the edges abutting the overlapping major surfaces, a layer of non-magnetizable material being provided between the overlapping major surfaces of said pole pieces so as to define a sensing gap, in which the first core part is I-shaped and in which the second core part is in the form of a single loop, the first core part laterally bridging said loop thereby forming two openings, the sensing gap being defined at one end of the I-shaped first core part, the first and the second core parts being magnetically coupled at the other end of the I-shaped core part in addition to the coupling at the sensing gap, and in which the loop-shaped core part has an auxiliary gap which extends at right angles to the sensing gap and centrally with respect to it, identical sensing windings being wrapped around the portions of the second core part on either side of the first core part and through each of said openings, said sensing windings being adapted for being connected to external circuitry in which their signals are substracted for producing a servo signal.

* * * * *